(12) United States Patent
Stewart

(10) Patent No.: US 9,272,767 B2
(45) Date of Patent: Mar. 1, 2016

(54) COMPACTING UNCURED COMPOSITE MEMBERS ON CONTOURED MANDREL SURFACES

(71) Applicant: The Boeing Company, Chicago, IL (US)

(72) Inventor: Samuel Ray Stewart, Redmond, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/904,224

(22) Filed: May 29, 2013

(65) Prior Publication Data

US 2014/0314996 A1    Oct. 23, 2014

Related U.S. Application Data

(60) Provisional application No. 61/813,821, filed on Apr. 19, 2013.

(51) Int. Cl.
| | | |
|---|---|---|
| *B29C 70/34* | (2006.01) |
| *B64C 1/06* | (2006.01) |
| *B64C 3/18* | (2006.01) |
| *B29C 53/04* | (2006.01) |
| *B29C 31/00* | (2006.01) |

(52) U.S. Cl.
CPC ............ *B64C 1/064* (2013.01); *B29C 31/008* (2013.01); *B29C 53/04* (2013.01); *B29C 70/342* (2013.01); *Y10T 428/24446* (2015.01); *Y10T 428/24628* (2015.01)

(58) Field of Classification Search
CPC .... B29C 33/485; B29C 33/50; B29C 33/505; B29C 2043/3605; B29C 31/008; B29C 53/04; B64C 1/064
See application file for complete search history.

(56) References Cited

U.S. PATENT DOCUMENTS

| | | | | |
|---|---|---|---|---|
| 2,816,593 A | * | 12/1957 | Hein | B21D 11/02 72/297 |
| 2,986,194 A | * | 5/1961 | De Marco | B21D 11/02 72/215 |
| 4,086,378 A | | 4/1978 | Kam et al. | |
| 4,185,069 A | * | 1/1980 | Smith | B29C 53/04 264/292 |
| 4,790,898 A | | 12/1988 | Woods | |
| 4,861,406 A | | 8/1989 | Baker et al. | |
| 5,214,951 A | * | 6/1993 | Waddell | B21D 9/03 72/297 |
| 5,676,080 A | * | 10/1997 | Allen | B63B 3/18 114/356 |
| 5,700,347 A | | 12/1997 | McCowin | |
| 6,045,651 A | | 4/2000 | Kline et al. | |

(Continued)

FOREIGN PATENT DOCUMENTS

| | | |
|---|---|---|
| CN | 102015261 A | 4/2011 |
| WO | 2007039085 A1 | 4/2007 |

(Continued)

OTHER PUBLICATIONS

International Search Report and Written Opinion, dated Aug. 7, 2014, reagarding Application No. PCT/US2014-031621, 10 pages.

(Continued)

*Primary Examiner* — Matthew Daniels
(74) *Attorney, Agent, or Firm* — Yee & Associates, P.C.

(57) ABSTRACT

An uncured composite member is formed over a mandrel having a contour using a flexible compactor. Forming is performed outwardly from the apex of the contour.

18 Claims, 10 Drawing Sheets

(56) References Cited

U.S. PATENT DOCUMENTS

| | | |
|---|---|---|
| 6,649,006 B2 | 11/2003 | Benson et al. |
| 6,814,916 B2 * | 11/2004 | Willden et al. ............... 264/257 |
| 7,137,182 B2 | 11/2006 | Nelson |
| 7,357,166 B2 * | 4/2008 | Pham et al. .................. 156/382 |
| 7,513,769 B2 | 4/2009 | Benson et al. |
| 7,644,491 B2 | 1/2010 | Absalonson |
| 7,788,784 B2 | 9/2010 | Absalonson et al. |
| 7,814,644 B2 | 10/2010 | Harrison |
| 8,663,526 B2 | 3/2014 | Duqueine et al. |
| 2002/0056788 A1 * | 5/2002 | Anderson ............. B29C 33/505 244/119 |
| 2006/0249626 A1 * | 11/2006 | Simpson et al. ........... 244/123.1 |
| 2008/0111024 A1 * | 5/2008 | Lee ......................... B64C 1/068 244/121 |
| 2008/0290214 A1 * | 11/2008 | Guzman et al. ............... 244/119 |
| 2009/0000726 A1 * | 1/2009 | McCowin et al. ............ 156/212 |
| 2009/0008825 A1 | 1/2009 | Eberth et al. |
| 2013/0036922 A1 | 2/2013 | Stewart et al. |
| 2013/0333830 A1 | 12/2013 | Stewart |

FOREIGN PATENT DOCUMENTS

| | | |
|---|---|---|
| WO | 2008003721 A1 | 1/2008 |
| WO | 2011032865 A1 | 3/2011 |
| WO | WO2013022534 A2 | 2/2013 |

OTHER PUBLICATIONS

Final Office Action, dated Nov. 5, 2014, regarding U.S. Appl. No. 13/205,226, 7 pages.

Notice of Allowance, dated Dec. 1, 2014, regarding U.S. Appl. No. 13/205,226, 10 pages.

Office Action, dated May 8, 2014, regarding U.S. Appl. No. 13/205,226, 13 pages.

PCT search report dated Feb. 7, 2013 regarding application PCT/US2012/045674, filed Jul. 6, 2012, applicant The Boeing Company, 10 pages.

Canadian Intellectual Property Office Examination Search Report, dated Mar. 12, 2015, regarding Application No. 2,835,892, 4 pages.

State Intellectual Property Office of PRC Notification of First Office Action and English Translation, issued Jun. 26, 2015, regarding Application No. 201280038782.7, 16 pages.

* cited by examiner

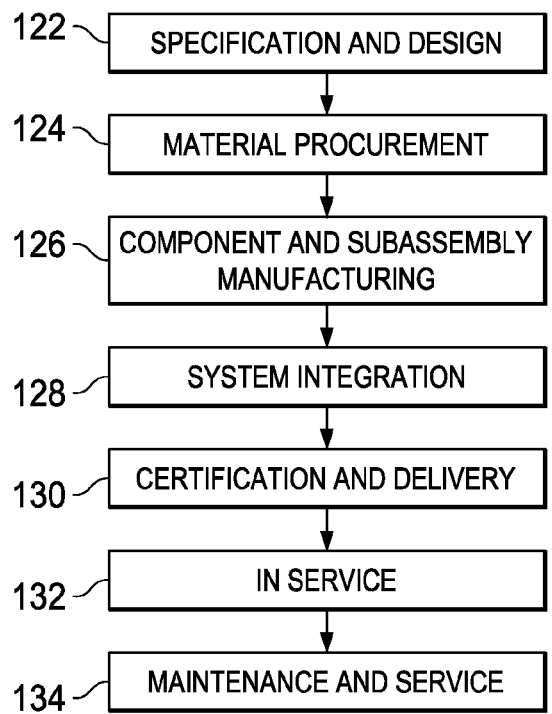
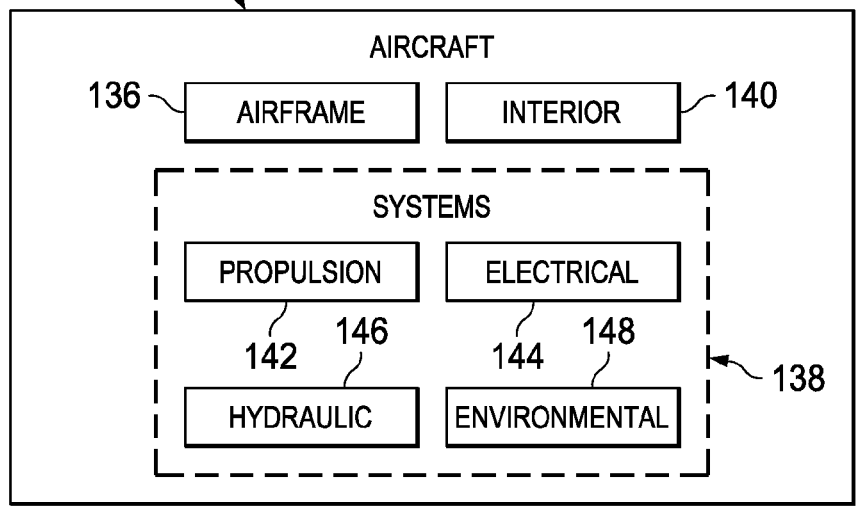

COMPACTING UNCURED COMPOSITE MEMBERS ON CONTOURED MANDREL SURFACES

RELATED PROVISIONAL APPLICATION

This application is related to and claims the benefit of priority of provisional U.S. Patent Application Ser. No. 61/813,821, filed Apr. 19, 2013, entitled "Compacting Uncured Composite Members on Contoured Mandrel Surfaces", which is incorporated herein by reference.

BACKGROUND INFORMATION

1. Field

The present disclosure generally relates to processes for manufacturing composite structures, and deals more particularly with compaction of composite laminate stringers on contoured mandrel surfaces.

2. Background

Elongate composite members such as stringers used in the aircraft industry may be contoured in one or more planes along their length to conform to the curvature of a structure such as a fuselage skin. Contouring of a stringer may be accomplished using a compactor to compact an uncured stringer layup against contoured surfaces of a mandrel, such as a cure tool. Flexible compactors have been developed which flex or bend, allowing them to conform to contoured tool surfaces during the compaction process.

Depending on the degree of tool contour, the uncured stringer layup may develop wrinkles as it is being compacted against the tool, particularly near the center of curvature or greatest contour of the tool. This wrinkling occurs as a result of bending of the layers of composite material nearest the contoured tool surface, placing them in compression. Compression of the material in this manner causes excess material to accumulate and bunch into wrinkles. Wrinkling may have an undesired effect on the performance of the cured stringer.

Accordingly, there is a need for a method of compacting uncured composite members, such as stringers, on contoured tools, which controls material wrinkling. There is also a need for a method of compacting a stringer on a cure tool using a flexible compactor that reduces the size of the wrinkles while distributing the wrinkles generally uniformly along the length of the stringer.

SUMMARY

Uncured composite members such as stringers may be bent to conform to a shaping mandrel such as a contoured cure tool, while avoiding the formation of relatively large wrinkles in the composite material. Any wrinkling of the composite material is limited to relatively small wrinkles which are distributed generally uniformly along the contoured areas of the stringer. The avoidance of large wrinkles results in stringers having improved structural performance and uniformity. Uniform distribution of material wrinkling is achieved using an apex forming method and a flexible compactor. During the apex forming, the flexible compactor is used to place and bend the uncured stringer against a contoured tool surface, beginning at the apex of the contour, and moving outwardly from the apex. The flexible compactor includes a series of transverse kerfs therein into which excess composite material may be received during the compaction process to allow controlled formation of relatively small material wrinkles which do not materially affect stringer performance.

According to one disclosed embodiment, a method is provided of compacting an uncured composite member against a mandrel surface having a contour. The method comprises adhering the uncured composite member to a compactor. The compactor is also used to align the uncured composite member with the contour of the mandrel surface, and to bring the uncured composite member initially into contact with the mandrel surface at the apex of the contour. The method includes forming the uncured composite member over the contour of the mandrel surface, and the compactor is used to compact the uncured composite member against the mandrel surface. Forming the uncured composite member may be performed by drape forming the uncured composite member onto the mandrel surface. The drape forming includes maintaining a substantially constant relationship between ends of the uncured composite member and the mandrel surface as the uncured composite member is being formed onto the mandrel surface. Forming the uncured composite member may be performed by lash forming. The forming includes reducing localized compressive forces in the uncured composite member adjacent the mandrel surface by inducing an S-shaped bend into the uncured composite member. Forming the uncured composite member over the contour is performed after the uncured composite member has been brought into initial contact with the mandrel surface at the apex. The forming may be performed by forming the uncured composite member onto the mandrel surface progressively outwardly along the uncured composite member from the apex. The uncured composite member has a preselected positional attitude when it is brought into initial contact with the mandrel surface at the apex, and the positional attitude of outer sections of the uncured composite member are maintained substantially parallel to the preselected positional attitude as the uncured composite member is being formed over the contour of the mandrel surface. Forming the uncured composite member includes bending the uncured composite member to a progressively smaller radius of curvature. The method may further comprise distributing any wrinkles that form in the uncured composite member during the forming by allowing material in the uncured composite member to become compressed into kerfs in the compactor. The method may also comprise using the compactor to reduce wrinkling of the uncured composite member during forming by shifting the location of the neutral axis of the uncured composite member.

According to another embodiment, a method is provided of controlling wrinkling of an uncured composite stringer during forming of the composite stringer over a contour of a mandrel surface, comprising aligning the composite stringer with the apex of the contour of the mandrel surface, and bringing the composite stringer into contact with the mandrel surface at the apex. The composite stringer is formed from the apex down onto the mandrel surface. Forming the composite stringer from the apex includes bending the composite stringer down against the mandrel surface and progressively outwardly from the apex. Forming the stringer includes maintaining a substantially constant relationship between ends of the composite stringer and the mandrel surface, and may be performed by one of drape forming and lash forming. The method may further comprise installing a flexible compactor within the composite stringer, adhering the composite stringer to the compactor, and using the compactor to bring the composite stringer into contact with the mandrel surface at the apex, and to form the composite stringer from the apex down onto the mandrel surface. Adhering the composite stringer to the compactor is performed using a suction force. The stringer may be formed from the apex down onto the mandrel surface using a compactor. Wrinkling of the composite stringer is controlled by allowing material of the composite stringer to be compressed into the compactor. Forming the composite stringer from the apex down onto the mandrel surface is performed using a compactor, and the compactor is used to encourage substantially uniform distribution of wrinkles in the composite stringer.

According to still another embodiment, a method is provided of forming an uncured composite member into a contoured groove in a cure tool. The method comprises adhering an uncured composite member to a compactor, and using the compactor to bring the uncured composite member into initial contact with the cure tool at an apex of a contour along the contoured groove. The compactor is used to form the uncured composite member down into and along the contoured groove and progressively outwardly from the apex. The compactor is also used to distribute wrinkles formed in the uncured composite member during forming of the uncured composite member down into and along the contoured groove. Using the compactor to form the uncured composite member is performed by one of drape forming and lash forming.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 19 is an illustration of a flow diagram of aircraft production and service methodology.

FIG. 20 is illustration of a block diagram of an aircraft.

DETAILED DESCRIPTION

Figure 1:
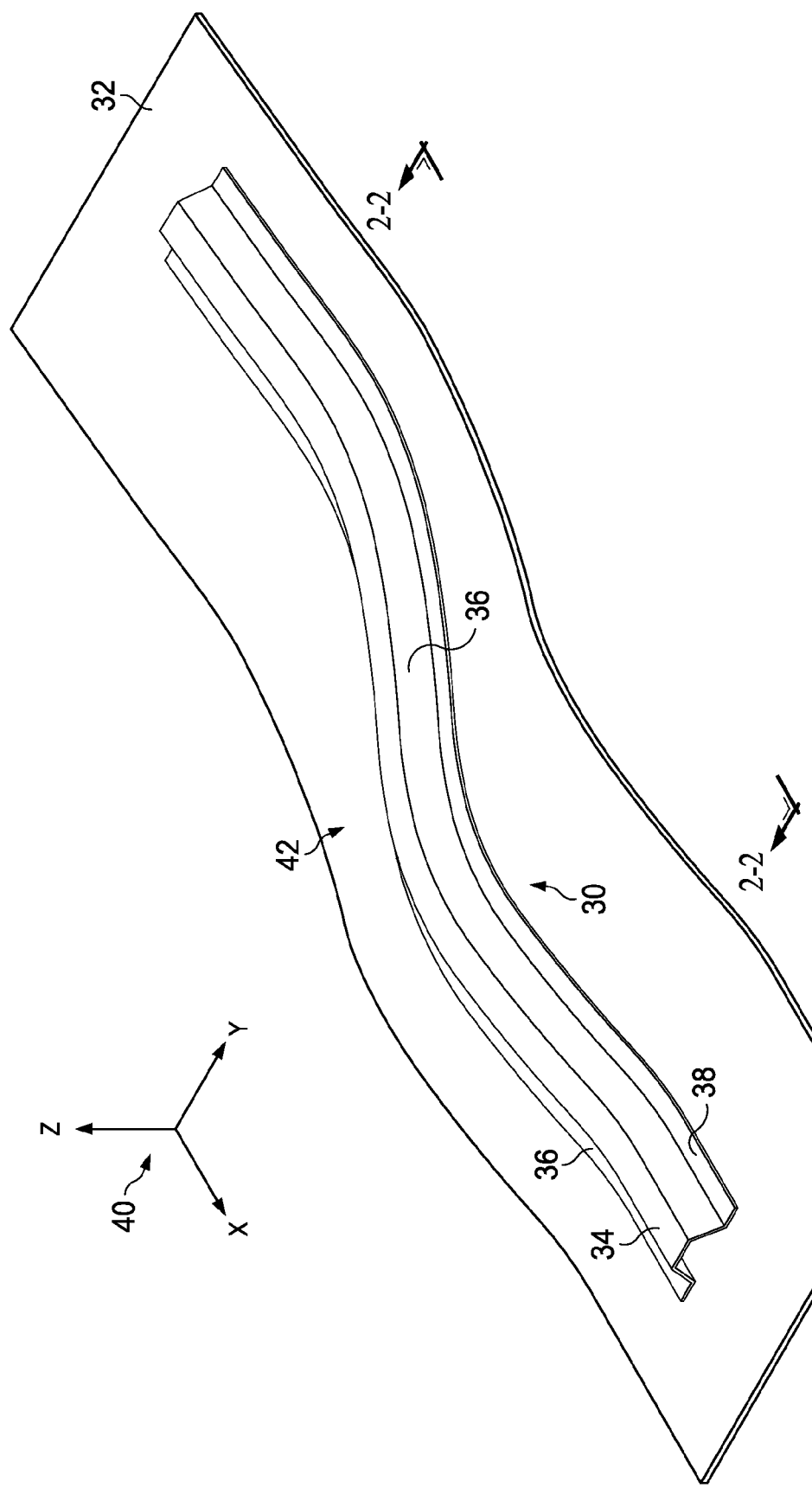
FIG. 1 is an illustration of a perspective view of a stringer contoured along its length in an XZ plane.
Figure 2:
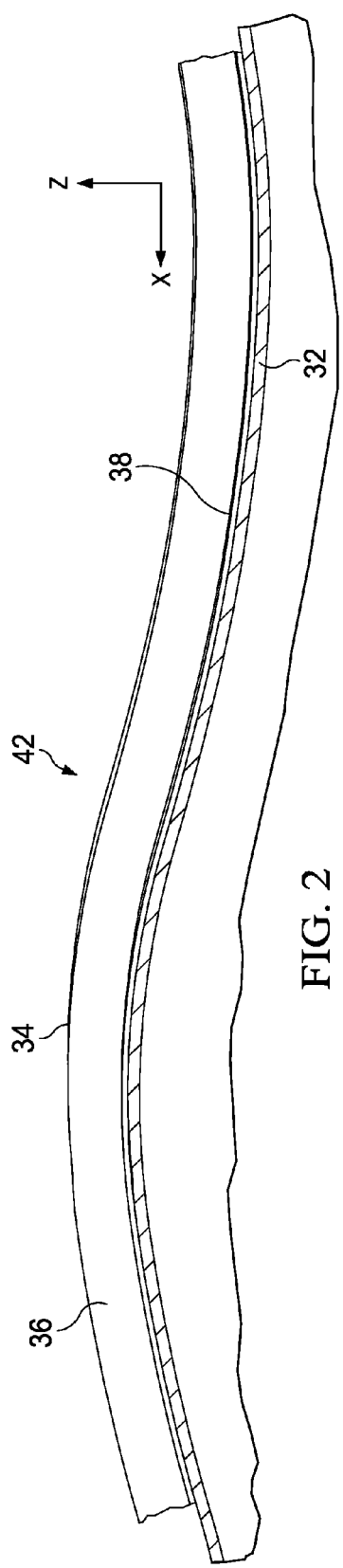
FIG. 2 is an illustration of a cross-sectional view taken along the line 2-2 in FIG. 1.

The disclosed embodiments may be employed in the fabrication of an elongate, composite member that is contoured or curved in one or more planes. For example, referring to FIGS. 1 and 2, a composite fuselage stringer 30 is attached by any suitable means to a skin 32. The stringer 30 possesses a hat shaped cross-sectional shape, comprising a cap 34, inclined sidewalls or webs 36, and outwardly turned, substantially flat flanges 38. Other cross sectional shapes are possible. In this example, the stringer 30 possesses a contour 42 lying in the XZ plane of an orthogonal coordinate system 40. The stringer 30 may comprise a multi-ply composite laminate, such as, without limitation, CFRP (carbon fiber reinforced plastic). It should be noted here that while a stringer 30 has been illustrated, the disclosed embodiments may be employed to fabricate any of a variety of elongate, composite members that have one or more curvatures in one or more planes.

Figure 3:
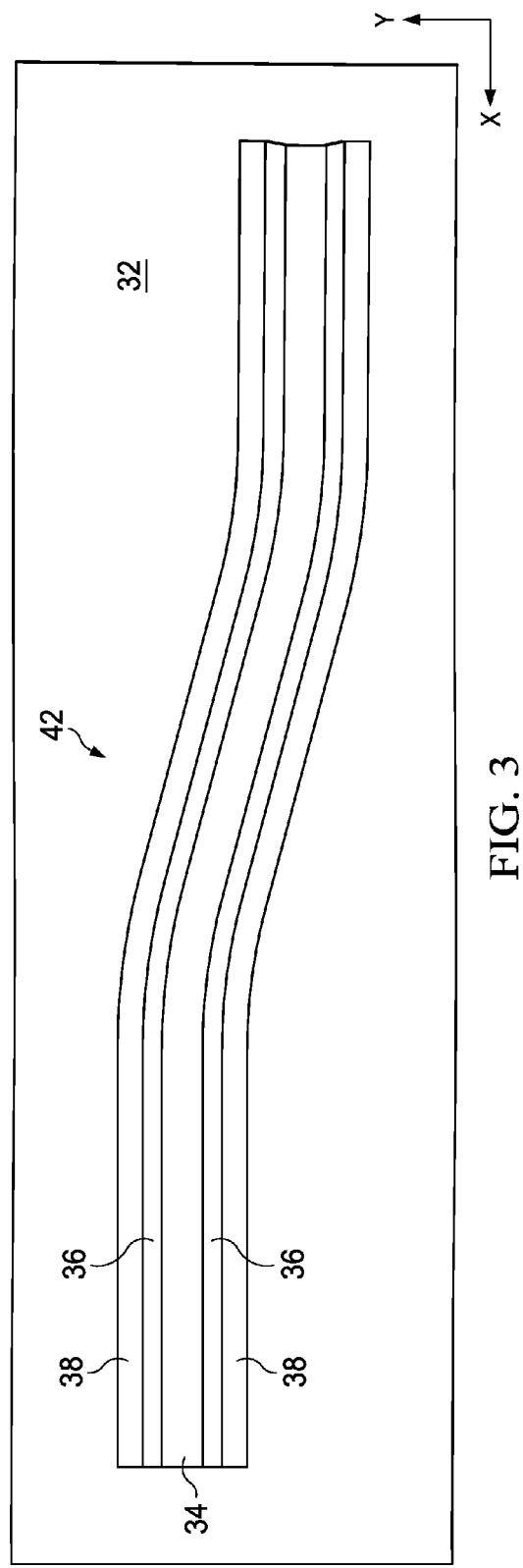
FIG. 3 is an illustration of a plan view of a stringer contoured along its length in XY plane.

As shown in FIG. 3, the stringer 30 may be contoured 42 in other planes, such as in the XY plane. In still other examples, the stringer 30 may be contoured in multiple planes. As will be discussed below in more detail, the stringer 30 is fabricated by laying up and forming prepreg to the desired cross-sectional shape. A compactor 44 (FIG. 4) is used to form the uncured stringer 30 into a contoured cure tool 68 (FIG. 8), and then compact it during a cure cycle.

Figure 4:
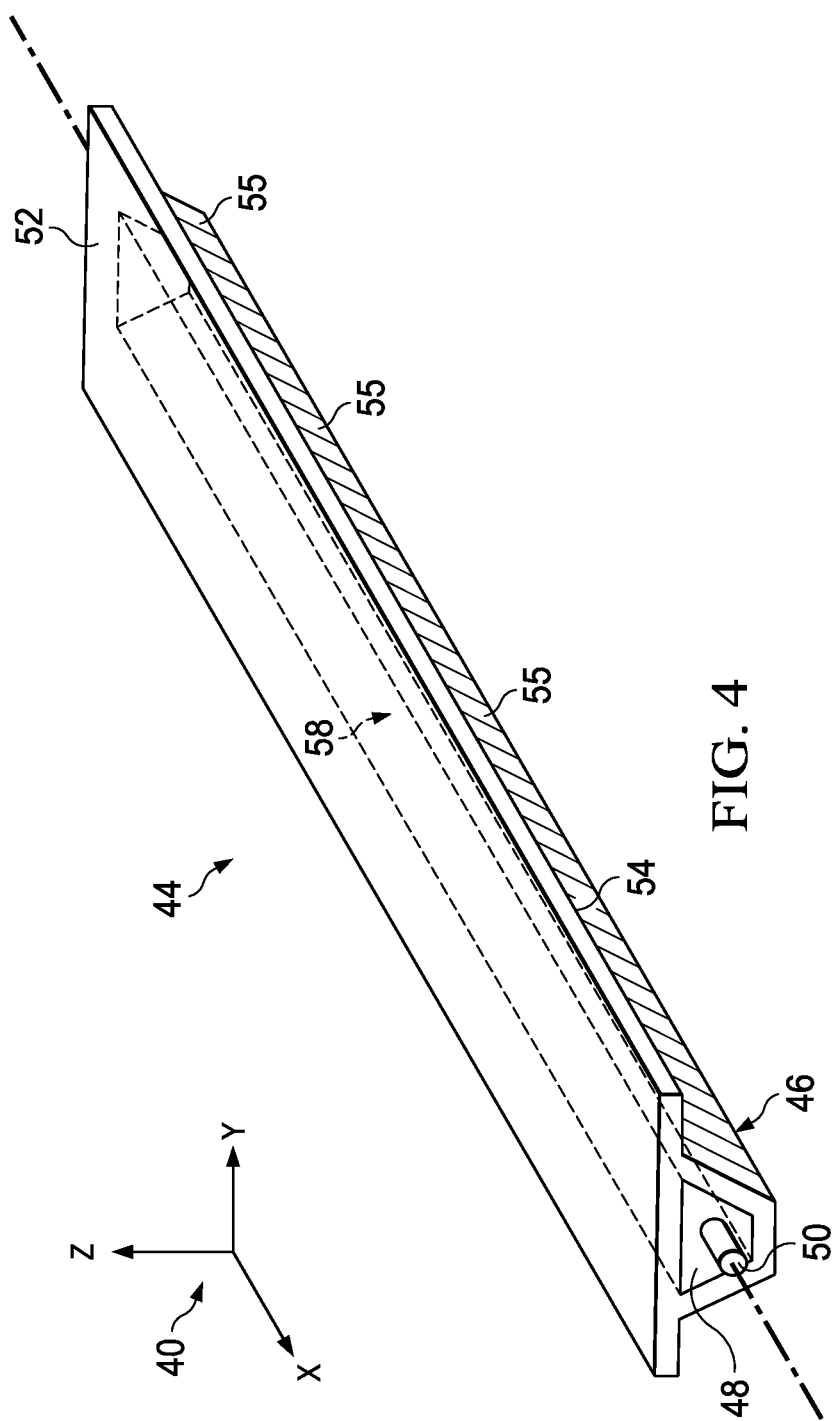
FIG. 4 is an illustration of a perspective view of a flexible compactor used to compact the stringers shown in FIGS. 1-3 against a cure tool.

Referring now to FIG. 4, a compactor 44 may be used to assist in transporting, placing, forming and compacting the uncured stringer 30. The stringer 30 is releasably held or adhered to the compactor 44 using a vacuum or suction force which will be discussed below. The compactor 44 is generally semi-rigid, with a degree of flexibility that allows it to flex and conform to contoured tool surfaces 66 during placement and compaction of the stringer 30. The compactor 44 may be constructed of materials that are suitable for the application such as, without limitation, a combination of CFRP and elastomer rubber. The compactor 44 functions both as a device for installing and forming the stringer 30, and for controlling the cross-sectional shape of the formed stringer 30 as it is being cured. The vacuum adherence of the stringer 30 to the compactor 44 may reduce the risk of damage to the stringer 30 during handling, and controls the stringer 30 during installation onto a contoured mandrel surface such as a cure tool 68 (see FIG. 5).

The compactor 44 broadly comprises a hat section 46, a flange section 52 and end walls 48 defining a generally open interior space 58. The hat section 46 includes a plurality of longitudinally spaced, transversely extending slits or kerfs 54 which provide the compactor 44 with flexibility, and allow air to be drawn into the open interior space 58. The vacuum fittings 50 in either, or both end walls 48, are adapted to be coupled with a vacuum source (not shown) for evacuating the open interior space 58. Although not shown in FIG. 4, the flange section 52 may include one or more sections or joints along its length which are flexible, allowing the compactor 44 to flex in either or both of the XY and XZ planes.

The vacuum created within the open interior space 58 causes air to be drawn in through the kerfs 54, producing a vacuum suction force 55. This vacuum suction force grips the uncured stringer 30, causing it to adhere and cling to the compactor 44 during the transport, placement and compaction processes. More particularly, the cap 34 and the webs 36 of the stringer 30 are adhered to the hat section 46 of the compactor 44 due to the vacuum suction force 55, while the flanges 38 of the stringer 30 are in face-to-face contact with, but are not adhered to the flange section 52 of the compactor 44. The vacuum adhesion of the stringer 30 to the compactor 44 may also permit a more symmetrical distribution of ply wrinkling and gathering during stringer compaction, as will be discussed below in greater detail. Moreover, the compactor 44 induces acceptable wrinkles 60a at the locations of the kerfs 54. "Acceptable wrinkles or wrinkling", as used herein, refers to wrinkles which are sufficiently small in size and generally distributed along a sufficient length such that they do not have a material impact of the performance of the cured stinger 30 in-service, when placed under load.

Figure 5:
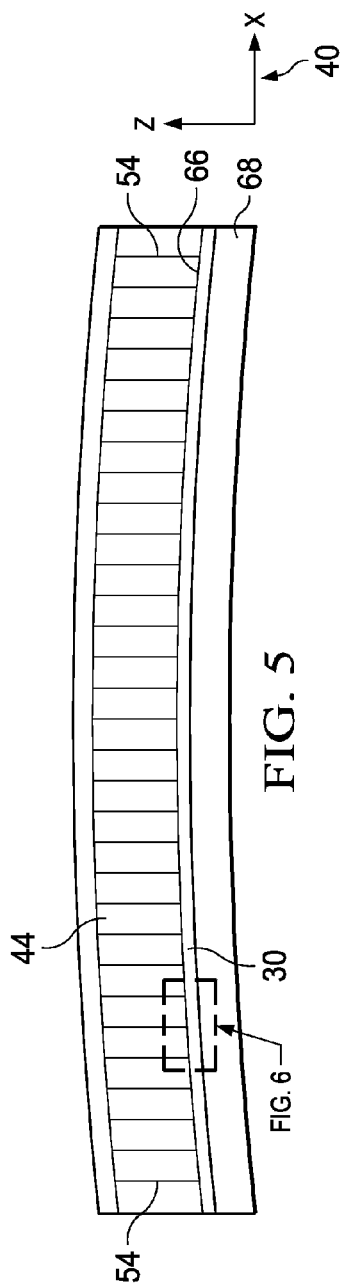
FIG. 5 is an illustration of a longitudinal sectional view of the compactor shown in FIG. 4, along with a stringer layup during compaction on a cure tool.
Figure 6:
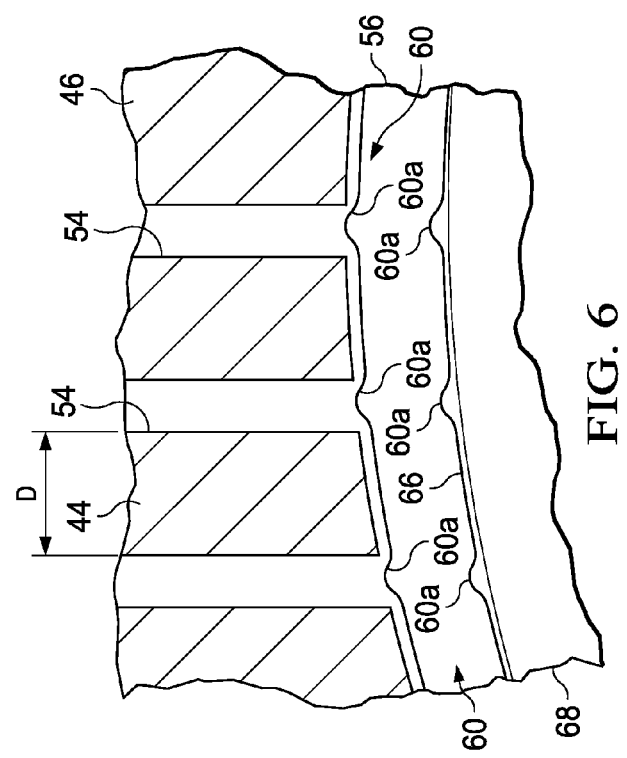
FIG. 6 is an illustration of the area designated as FIG. 6 in FIG. 5.

Referring now to FIGS. 5 and 6, the compactor 44 may be used to form and compact the uncured stringer onto a contoured surface 66 of a cure tool 68 or similar contoured mandrel surface. In FIG. 5, the compactor 44 is shown having flexed in the XZ plane, to form the stringer 30 down onto the contoured surface 66 of the cure tool 68. The vacuum adhesion of the stringer to the compactor 44 may aid in encouraging desired planar ply slippage between the outer plies (closest to the compactor 44) and the inner plies (closest to the cure tool surface 66) during this forming process. The method used to align, initially engage and then form the stringer 30 onto the contoured surface 66 will be hereinafter referred to as an "apex" forming method.

The apex forming method results in the distribution of excess stringer material 60 along the length of the stringer 30 facing the contoured tool surface 66. This distributed, excess stringer material 60 is allowed and encouraged to move partially into the kerfs 54 under the compaction force applied to the stringer 30 by the compactor 44. The excess stringer material 60 which is under compression 78 (see FIG. 6), forms into a series of distributed, relatively small acceptable wrinkles 60a respectively within the kerfs 54. Because of the relatively small size of the wrinkles 60a, and the fact that they are distributed generally uniformly along a sufficient the length of the stringer 30, stress concentrations within the cured stringer 30 under load, caused by material wrinkling, are substantially reduced or eliminated. The location and distribution of the wrinkles 60a is dependent in part, upon the distance "D" between the kerfs 54. The distance "D" between the kerfs 54 may be generally constant along the length of the compactor 44 to produce a substantially even distribution of the wrinkles 60a. However, in some embodiments, it may be desirable to tailor the distribution of the wrinkles 60a such that they are not evenly distributed. As the number of kerfs 54 provided in the compactor 44 increases, the number of induced wrinkles likewise increases while the size of each of the induced wrinkles decreases. Also, as the number of kerfs increase, the ability of the compactor 44 to bend around tool surfaces with tighter radii increases. Generally, it may be desirable to increase the number of wrinkles 60a while decreasing their size to the point that the wrinkles 60a have a substantially negligible effect on the performance of the stringer 30 when placed in service.

Figure 7:
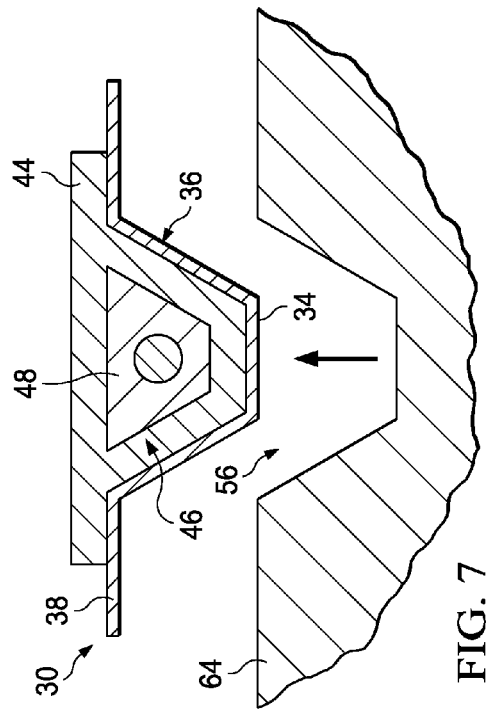
FIG. 7 is an illustration of a cross-sectional view showing the compactor removing a stringer from a forming die.

FIGS. 7-10 illustrate the sequential steps of forming, transporting, placing, forming and compacting the stringer 30 on the contoured surface 66 of a cure tool 68 using the compactor 44. A prepreg layup may be formed into a desired hat shaped cross-section using any of various techniques, such as by stamp forming a flat layup (not shown) between male and female dies (only the female die 64 is shown in FIG. 7), or by the vacuum bag forming a flat layup onto a male die (not shown).

With the stringer 30 having been formed to the desired cross-sectional shape, for example in a female die 64, the compactor 44 is placed in the stringer 30 such that the hat section 46 of the compactor 44 engages webs 36 and the cap 34 of the stringer 30, and the flange section 38 of the compactor 44 overlies and engage the flanges 38 of the stringer 30. Depending upon the material and surface finish from which the compactor 44 is formed, it may be necessary to install a release agent, such as a peel ply, between the compactor 44 and the stringer 30. For example, and without limitation a layer (not shown) of FEP (fluorinated ethylene propylene) film may be taped to the compactor 44, covering the hat section 46 of the compactor 44. Vertical slits (not shown) may be formed in the FEP film along the length of the compactor 44 to allow air to flow through the film and into the kerfs 54 of the compactor 44.

The stringer 30 and the compactor 44 may remain in the female die 64 which may be used as a holding fixture to maintain the shape of the stringer 30 until the stringer 30 is ready to be removed and transported for placement. Optionally, the stringer 30 may be transferred to a holding fixture (not shown) until ready for transfer to a cure tool 68. In order to remove stringer 44 from the female die 64 (or an optional holding fixture), a vacuum is drawn within the compactor 44 which draws air in through the kerfs 54 (FIGS. 4-6) to create a suction force that causes the stringer 30 to adhere to and be gripped by the compactor 44.

With the stringer 30 adhered to the compactor along its length, the stringer 30 and compactor 44 behave as a single unit during subsequent processing, including forming onto the cure tool 68. In order to control wrinkling of the stringer 30 during subsequent processing, the vacuum causing the stringer 30 to adhere to the compactor 44 is maintained until the stringer 30 has been formed onto the cure tool 68. In order to assure that the stringer 30 is not dis-bond from the compactor during the forming process, it may be necessary to adjust the forming rate relative to the amount of vacuum force applied to the stringer 30 to allow the stringer 30 to bend slowly along with bending of the compactor 44. The vacuum-generated adhesion force adhering the stringer to the compactor 44 must be stronger than the localized bending forces induced in the stringer 30 in order to disperse the wrinkles 60a along the stringer 30.

Figure 8:
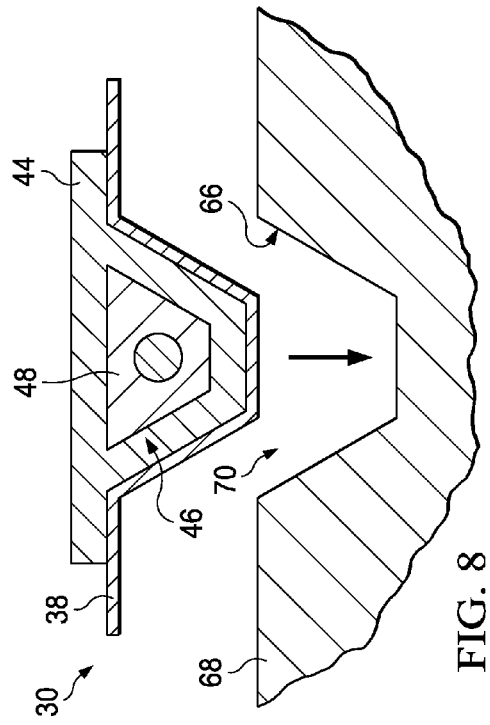
FIG. 8 is an illustration of a cross-sectional view showing the compactor indexed and aligned in readiness for forming the stringer into a contoured cure tool cavity.
Figure 9:
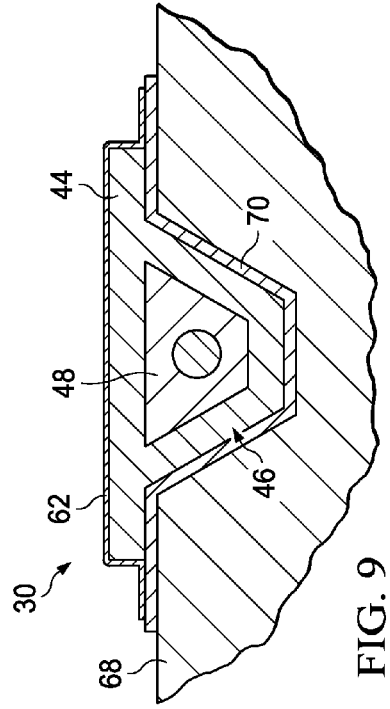
FIG. 9 is an illustration of a cross-sectional view showing the stringer having been formed into the contoured tool cavity, and a vacuum bag having been installed in preparation for curing the stringer.

As shown in FIG. 7, with the stringer 30 adhered to the compactor 44, the compactor 44 is lifted along with the stringer 30 away from female die 64, and is used to transport the stringer 30 to a forming mandrel such as the cure tool 68 shown in FIG. 8. The cure tool 68 has contoured tool surfaces 66 forming a contoured tool cavity or groove 70. The contoured tool surfaces 66 are curved or contoured in at least one plane and substantially match the outer mold line (OML) surface (not shown) of the stringer 30.

The compactor 44 is used to place and form the stringer 30 onto the contoured tool surfaces 66, along the length of the tool cavity 70, as shown in FIG. 8. As will be later discussed, the compactor 44 flexes to conform to the contoured surfaces 66 of the tool cavity 70, causing the stringer 30 to also be formed to the contoured shape of the tool cavity 70. According to the disclosed apex method of forming, any wrinkling of the stringer 30 as it is being formed down into the contoured tool cavity 70 will be limited to relatively small scale "acceptable" wrinkles that are generally evenly distributed along the length of the stringer 30.

Figure 10:
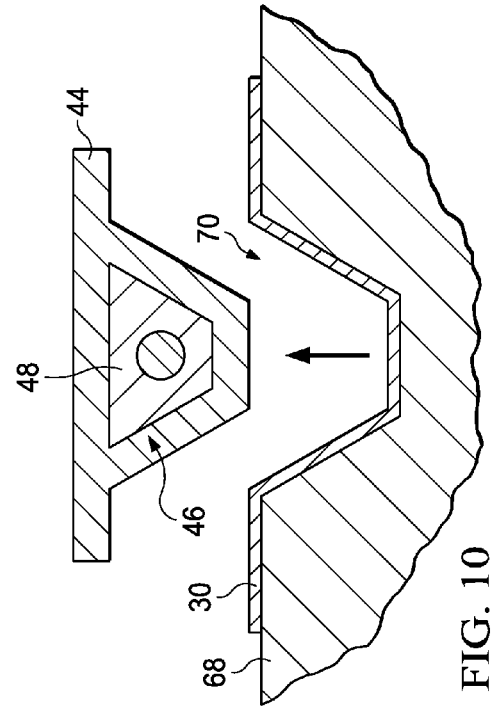
FIG. 10 is an illustration of a cross-sectional view showing the compactor being lifted away from the stringer following curing.

With the compactor 44 and the stringer 30 having been formed into the tool cavity 70, a vacuum bag (FIG. 9) is installed over the compactor 44 and the stringer 30, and a vacuum is drawn in the bag 62 which, along with the compactor 44, compacts the layup 30 against the contoured tool surfaces 66. Following compaction of the stringer 30, as shown in FIG. 10, the compactor 44 is drawn away from the stringer 30. In some applications, it may be desirable to apply a tackifier to the contoured tool surfaces 66 prior to installation of the stringer 30 and the cure tool 68 in order to aid separation of the compactor 44 from the cured stringer 30 following curing. The stringer 30 may then be further processed. For example, fillers (not shown) may be installed in the stringer 30, one or more bladders (not shown) may be installed against the stringer 30, the stringer 30 may be attached to the skin 32 (FIG. 1) or other structure, and cured in an autoclave (not shown).

Figure 11:
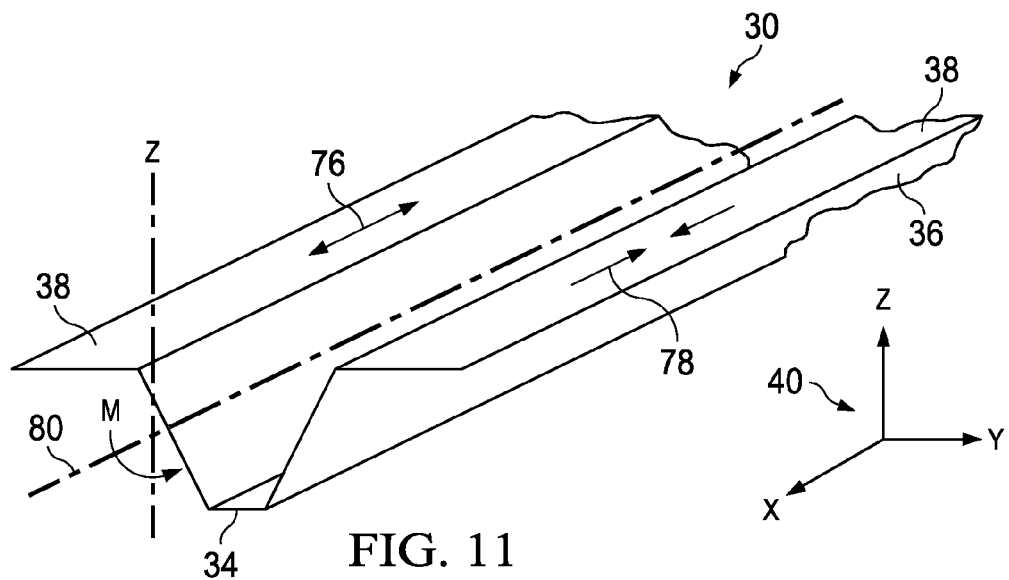
FIG. 11 is an illustration of a perspective view of a portion of a stringer, useful in explaining stresses on the stringer as it is being formed into the cure tool.
Figure 12:
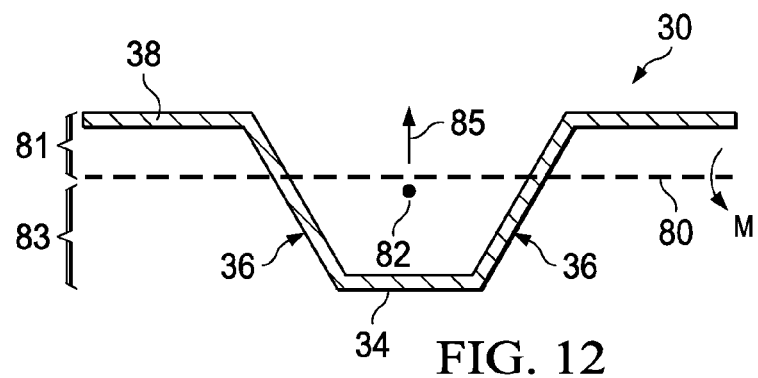
FIG. 12 is an illustration of an end view of the stringer shown in FIG. 11, showing the centroid and neutral axis of the stringer.

Attention is now directed to FIGS. 11 and 12 which illustrate stresses acting upon the stringer 30 when it is being formed onto contoured tool surfaces 66 of a mandrel, such as the cure tool 68 previously described. The stringer 30 may be formed along a curvature (not shown in FIG. 11) in either the XY or the XZ planes. The geometry of the stringer 30 will determine which of these two planes has the most influence on the installation. Regardless of the particular cross-sectional geometry of the stringer 30, the stringer 30 possesses a neutral axis 80, and a centroid or geometric center 82. In FIG. 11, the location of the neutral axis 80 is shown when forming the stringer 30 in the XY plane, while FIG. 12 shows the location of the neutral axis 80 when forming the stringer 30 in the XZ plane.

Referring to FIG. 11, when the stringer 30 is formed along a curvature in the XY plane, a bending moment M about the Z axis (axis of moment induction) is produced which causes one side of the stringer 30 be placed in tension 76, and the other side of the stringer 30 to be placed in compression 78. The neutral axis 80 shown in FIG. 12 is substantially perpendicular to the neutral axis 80 shown in FIG. 11 because the XZ and XY planes are perpendicular to each other, and likewise, the axes of momentum (the Y axis and the Z axis) are perpendicular to each other. The neutral axis 80 of the stringer 30 is a line or plane within the cross section of the stringer 30 at which no extension or compression of the stringer 30 occurs when it is bent, as occurs when the stringer 30 is being formed into a tool cavity 70 (FIG. 8) that is curved in either or both of the XY and XZ planes. Referring to FIG. 12, when the stringer 30 is formed along a curvature in the XZ plane, a bending moment M is produced about the neutral axis 80 (the Y axis) which causes the area 81 above the neutral axis 80 to be placed in tension, and the area 83 below the neutral axis 80 to be placed in compression.

The area 83 of the stringer 30 below the neutral axis 80 is the area most likely to wrinkle because it is loaded into compression 78 as the stringer is being formed in either the XY or XZ planes. In contrast, the area 81 that is in tension 76 during forming experiences a relatively small amount of strain, and thus normally does not wrinkle. The compression 78 below the neutral axis 80 causes a wrinkle 60a (see FIG. 6) to be formed in the stringer 30 as the stringer is being bent to a progressively smaller radius of curvature during a forming process, because the same amount of stringer material is being conformed to a smaller radius within the area 83 below the neutral axis 80. In effect, the flexible compactor 44 functions to shift 85 (FIG. 12) the neutral axis 80 downwardly, toward the cap 34 of the stringer 30. As a result of the neutral axis 80 being shifted 85 downwardly, the amount of compression in the area 83 below the neutral axis 80 within the stringer 30 is reduced, and less wrinkling occurs in this area due to the reduced compressive forces.

Figure 13:
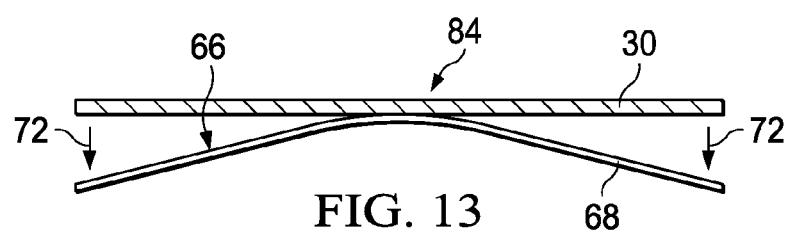
FIG. 13 is an illustration of a longitudinal side view of a stringer, in which the stringer has been brought into initial contact with the apex of a contoured mandrel surface in preparation for apex forming of the stringer.

As previously discussed, apex forming is used to form the stringer 30 into and along the contoured tool cavity 70 (FIG. 8) in order to control wrinkling of the stringer 30 during the forming process. FIG. 13 diagrammatically illustrates the apex forming method, generically. A cure tool 68 has a contoured tool surface 66 over which a substantially straight stringer 30 is to be formed by bending it to a progressively smaller radius of curvature until it conforms to the curvature of the contoured tool surface 66. The straight stringer 30 comprises a stack of substantially planar plies of uncured composite material such as pre-preg. The curvature of the contoured tool surface 66 has an apex 84 which corresponds to the point of maximum curvature on tool surface 66. With the stringer 30 adhered to the compactor 44 (as shown in FIG. 8), the compactor 44 is used to align and index the stringer 30 relative to the cure tool 68. The compactor 44 then initially brings the stringer 30 into contact with the tool surface 66 at the apex 84. After this initial contact at the apex 84, the stringer 30 is formed down 72 onto the contoured tool surface 66 and into the tool cavity 70 (FIG. 8). The particular technique used to form the stringer 30 down onto the contoured tool surface 66 after compaction at the apex 84 will depend upon whether the stringer 30 is being formed in the XY or the XZ plane, as will be discussed below. In applications where the tool surface 66 has compound contours and it is necessary to form the stringer 30 in both the XY and XZ planes, the compactor 44 may flex simultaneously in both the XY and XZ planes. The compactor 44 may also form a torsional twist into the stringer 30 during the forming process, either independently of, or in addition to flexing in either of the XY and XZ planes.

Figure 14:
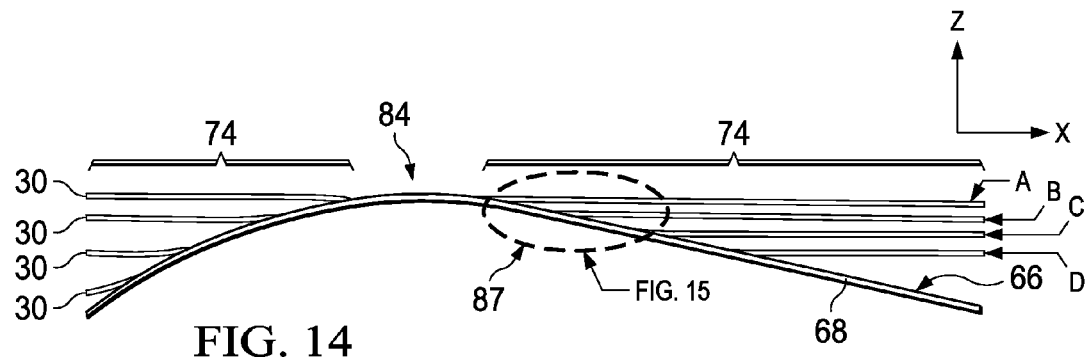
FIG. 14 is an illustration of a diagram useful in explaining the apex forming method using a lash technique.
Figure 15:
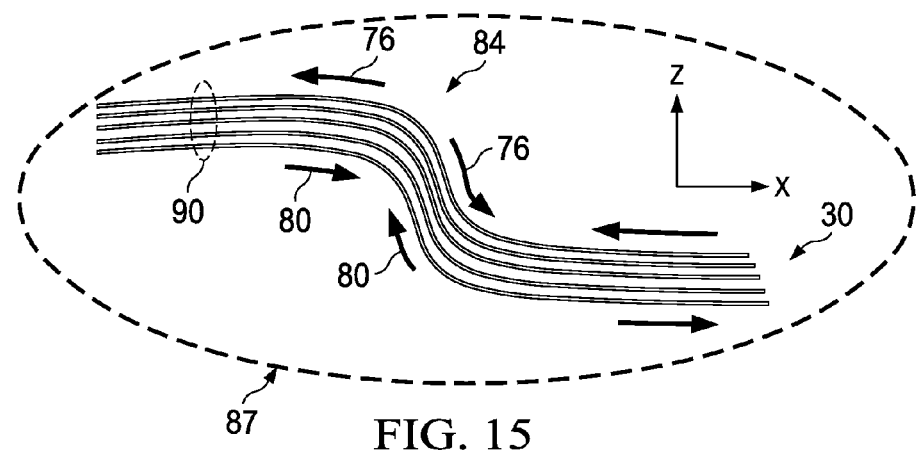
FIG. 15 is an illustration of the area designated as FIG. 15 in FIG. 14.

FIGS. 14 and 15 illustrate apex forming of a stringer 30 onto a contoured mandrel surface 66, such as that of a contoured cure tool 68, contoured in the XZ plane, using a lash forming technique. The sequential positions and bend shapes of the stringer 30 are respectively designated by the letters "A-D" in FIG. 14, and the individual laminate plies 90 of the stringer 30 are shown in FIG. 15. During this lash forming, the outer sections 74 not already in contact with the tool surface 66 are held substantially parallel to the initial positional attitude (designated by the letter "A") of the stringer 30 when it initially comes into contact with apex 84. Lash forming of the stringer 30 in this manner induces an "S" bend 87 (see FIG. 15) into the stringer 30. The formation of the "S" bend 87 shifts the location within the stringer 30 where tensile and compressive forces 76, 80 respectively are acting. Inducing an "S" bend 87 into the plies 90 of the stringer 30 helps spread the wrinkling of the plies by reducing the localized compressive forces in the area adjacent the contoured tool surface 66 where wrinkling may be expected to occur.

Figure 16:
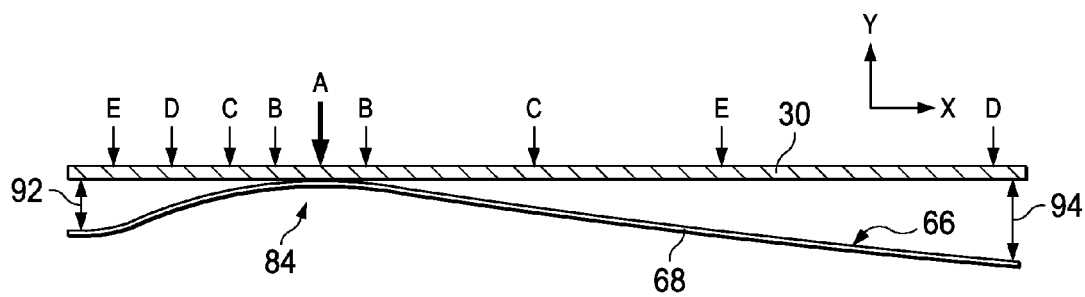
FIG. 16 is an illustration of a diagram useful in explaining the apex forming method using a draping technique.
Figure 17:
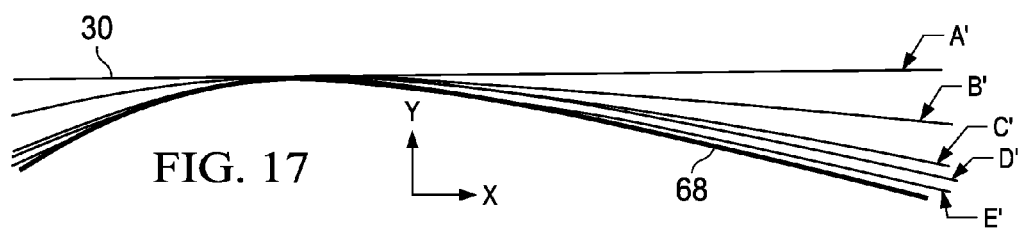
FIG. 17 is an illustration showing the progressive shaping of the stringer during apex forming using the draping technique.

FIGS. 16 and 17 illustrate apex forming of a stringer 30 contoured in the XY plane, using the compactor 44 to carry out a drape forming technique. The compactor is aligned and indexed such that it initially brings the stringer 30 into a first point of contact "A" corresponding to the apex 84 of the contoured tool surface 66. The stringer 30 is then evenly draped onto the cure tool 68, into the contoured tool cavity 70 (FIG. 8), by bending the stringer 30 about the apex 84. The letters "B", "C", "D" and "E" in FIG. 16 respectively represent simultaneous points of contact between the stringer 30 and the tool surface 66 as the bending process progresses. The corresponding bent positions of the stringer 30 are likewise designated in FIG. 17 by the letters "B'", "C'", "D'" and "E'". During the bending process, the relationship of the distances 92, 94 (FIG. 16) between the ends of the stringer 30 and the tool surface 66 is maintained substantially constant in order to maintain an attitude of the stringer 30 that results in substantially even bending about the apex 84. As previously noted, during this forming process, the vacuum adhesion of the stringer to the compactor 44 may aid in encouraging desired slippage between the planar plies of the stringer 30.

Figure 18:
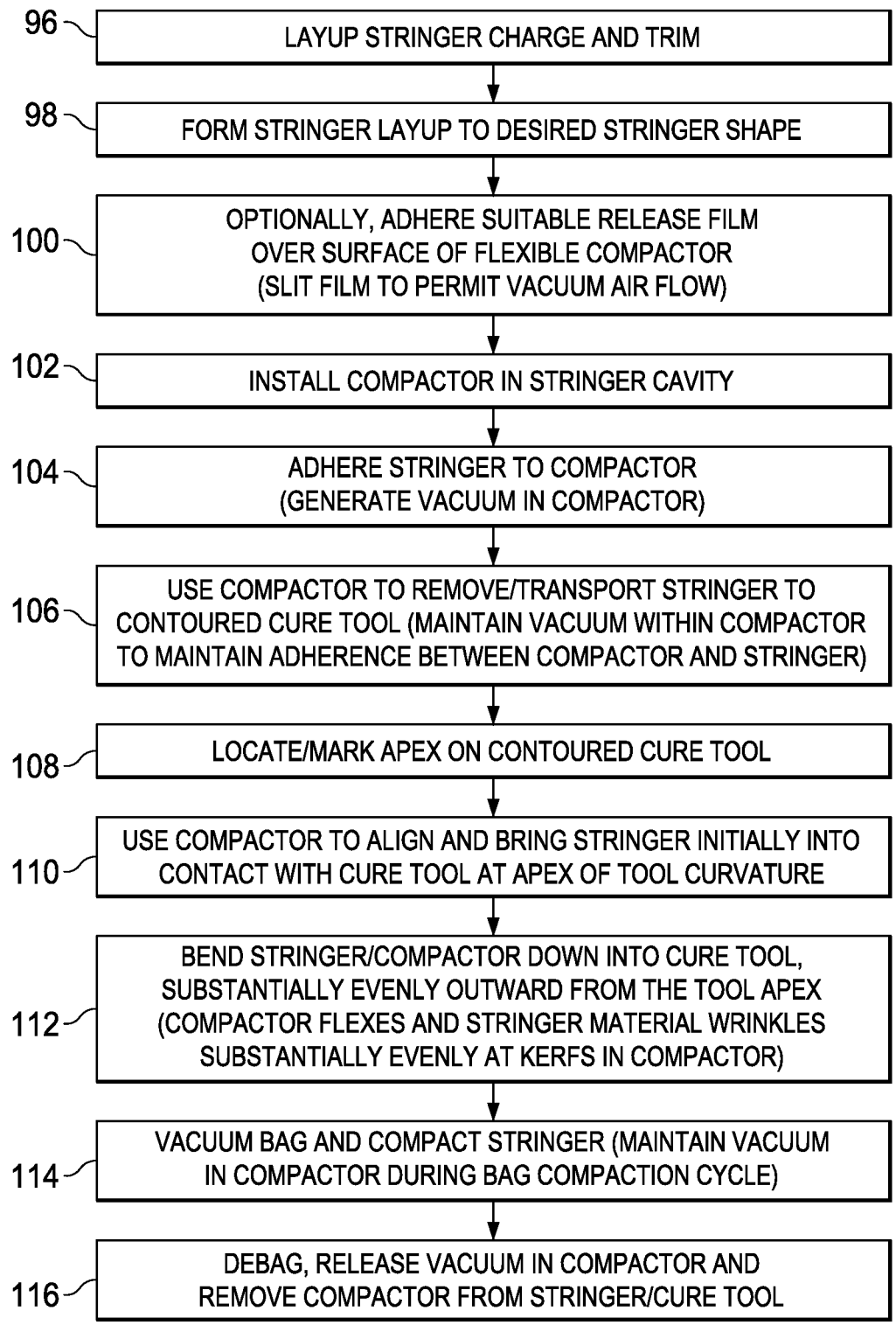
FIG. 18 is an illustration of a flow diagram of a method of fabricating a stringer that includes use of the apex forming method.

Attention is now directed to FIG. 18 which broadly illustrates the steps of a method of fabricating a contoured composite stringer 30 using the apex forming method and the compactor 44 described above. Beginning at 96, a stringer charge is laid up and trimmed as necessary. The stringer layup is then formed to the desired stringer cross-sectional shape at step 98. Optionally, at step 100, a suitable perforated release film such as FEP, may be placed over and adhered to the compacting surface of a flexible compactor 44. The perforations allow vacuum airflow through the film and may be formed, for example and without limitation, by creating a series of slits in the film. At step 102, the compactor 44 is installed into the cavity of the formed the stringer 30.

At 104, a vacuum is generated within the compactor 44 which adheres the stringer 30 to the compactor 44, effectively causing the compactor 44 to grip the stringer 30. At 106, the compactor 44 may be used to remove and transport the stringer 30 to a contoured forming mandrel, which may comprise a cure tool 68. As the stringer 30 is being removed and transported, vacuum is held within the compactor 44 to maintain adherence between the compactor 44 and the stringer 30. At 108, the apex 84 of the contoured mandrel or cure tool 68 is located, and may be marked as a reference starting point to aid in the subsequent forming process. At step 110, the compactor 44 is used to align and bring the stringer 30 initially into contact with the contoured mandrel surface or cure tool 68, at the apex 84 of the contoured tool surface 66.

At 112, the compactor 44 is used to bend the stringer 30 down onto the mandrel or cure tool surface 66, substantially evenly, outward from the apex, using either the drape forming or lash forming technique previously described. During the bending process, the compactor 44 along with the stringer 30 flexes to conform to the contour of the mandrel or tool 68, causing the stringer material to wrinkle in a substantially even distribution along the length of the stringer contour. At 114, the formed stringer 30 may be vacuum bagged and then compacted at room temperature using the compactor 44, during which the vacuum within compactor 44 is maintained. At step 116, the stringer 30 is debagged, and the vacuum within the compactor 44 is released, allowing removal of the compactor 44 and the stringer 30 from the cure tool 68.

Embodiments of the disclosure may find use in a variety of potential applications, particularly in the transportation industry, including for example, aerospace, marine, automotive applications and other applications where contoured elongate composite members, such as stringers, may be used. Thus, referring now to FIGS. 19 and 20, embodiments of the disclosure may be used in the context of an aircraft manufacturing and service method 118 as shown in FIG. 19 and an aircraft 120 as shown in FIG. 20. Aircraft applications of the disclosed embodiments may include, for example, without limitation, elongate stiffener members such as stringers used in the airframe 136 of the aircraft 120. During pre-production, exemplary method 118 may include specification and design 122 of the aircraft 120 and material procurement 124. During production, component and subassembly manufacturing 126 and system integration 128 of the aircraft 120 takes place. Thereafter, the aircraft 120 may go through certification and delivery 130 in order to be placed in service 132. While in service by a customer, the aircraft 120 is scheduled for routine maintenance and service 134, which may also include modification, reconfiguration, refurbishment, and so on.

Each of the processes of method 118 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 120 produced by exemplary method 118 may include an airframe 136 with a plurality of systems 138 and an interior 140. Examples of high-level systems 138 include one or more of a propulsion system 142, an electrical system 144, a hydraulic system 146 and an environmental system 148. Any number of other systems may be included. Although an aerospace example is shown, the principles of the disclosure may be applied to other industries, such as the marine and automotive industries.

Systems and methods embodied herein may be employed during any one or more of the stages of the production and service method 118. For example, components or subassemblies corresponding to production process 126 may be fabricated or manufactured in a manner similar to components or subassemblies produced while the aircraft 120 is in service. Also, one or more apparatus embodiments, method embodiments, or a combination thereof may be utilized during the production stages 126 and 128, for example, by substantially expediting assembly of or reducing the cost of an aircraft 120. Similarly, one or more of apparatus embodiments, method embodiments, or a combination thereof may be utilized while the aircraft 120 is in service, for example and without limitation, to maintenance and service 134.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, "at least one of" means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of compacting an uncured composite member against a mandrel surface having a longitudinal contour and curing, comprising:
adhering the uncured composite member to a flexible elongate compactor using a suction force;
using the compactor to align the uncured composite member with the longitudinal contour of the mandrel surface;
using the compactor to bring the uncured composite member initially into contact with the mandrel surface at an apex of the longitudinal contour;
forming the uncured composite member over the contour of the mandrel surface outwardly from the apex;
using the compactor to compact the uncured composite member against the mandrel surface; and
curing the uncured composite member between the mandrel surface and the compactor.

2. The method of claim 1, further comprising:
distributing any wrinkles that form in the uncured composite member during the forming by allowing material in the uncured composite member to become compressed into kerfs in the compactor.

3. The method of claim 1, wherein the uncured composite member has a neutral axis and the method further comprises:
using the compactor to reduce wrinkling of the uncured composite member during forming by shifting the location of the neutral axis of the uncured composite member.

4. The method of claim 1, wherein forming the uncured composite member includes using the compactor to form a twist into the uncured composite member.

5. The method of claim 1, wherein forming the uncured composite member is performed by drape forming the uncured composite member onto the mandrel surface.

6. The method of claim 5, wherein the drape forming includes maintaining a substantially constant relationship between ends of the uncured composite member and the mandrel surface as the uncured composite member is being formed onto the mandrel surface.

7. The method of claim 1, wherein forming the uncured composite member is performed by lash forming.

8. The method of claim 7, wherein the lash forming includes reducing localized compressive forces in the uncured composite member adjacent the mandrel surface by inducing an S-shaped bend into the uncured composite member.

9. The method of claim 1, wherein:
the uncured composite member has a preselected positional attitude when it is brought into initial contact with the mandrel surface at the apex, and
the positional attitude of outer sections of the uncured composite member are maintained substantially parallel to the preselected positional attitude as the uncured composite member is being formed over the contour of the mandrel surface.

10. The method of claim 1, wherein forming the uncured composite member includes bending the uncured composite member to a progressively smaller radius of curvature.

11. A method of controlling wrinkling of an uncured composite member during forming of a composite stringer over a longitudinal contour of a mandrel surface and curing, comprising:
installing a flexible elongate compactor within the uncured composite member;
adhering the uncured composite member to the compactor using a suction force;
aligning the uncured composite member with an apex of the longitudinal contour of the mandrel surface; and,
bringing the uncured composite member initially into contact with the mandrel surface at the apex using the compactor;
forming the uncured composite member from the apex down onto the mandrel surface using the compactor to form an uncured composite stringer; and
curing the uncured composite stringer between the compactor and mandrel surface.

12. The method of claim 11, wherein forming the uncured composite member from the apex includes bending the uncured composite member down against the mandrel surface and progressively outwardly from the apex.

13. The method of claim 11, wherein forming the uncured composite member from the apex includes maintaining a substantially constant relationship between ends of the uncured composite member and the mandrel surface.

14. The method of claim 11, wherein forming the uncured composite member is performed by one of drape forming and lash forming.

15. The method of claim 11, wherein:
wrinkling of the uncured composite member is controlled by allowing material of the uncured composite member to be compressed into the compactor.

16. The method of claim 11, wherein:
forming the uncured composite member from the apex down onto the mandrel surface is performed using a compactor, and
the compactor is used to encourage substantially uniform distribution of wrinkles in the uncured composite-member.

17. A method of forming an uncured composite member into a contoured groove in a cure tool and curing, comprising:
adhering the uncured composite member to a flexible elongate compactor using a suction force;
using the compactor to bring the uncured composite member into initial contact with the cure tool at an apex of a longitudinal contour along the contoured groove;
using the compactor to form the uncured composite member down into and along the contoured groove and progressively outwardly from the apex;
using the compactor to distribute wrinkles formed in the uncured composite member during forming of the uncured composite member down into and along the contoured groove; and
curing the uncured composite member between the cure tool and the compactor.

18. The method of claim 17, wherein using the compactor to form the uncured composite member is performed by one of drape forming and lash forming.

* * * * *